Figure 1:
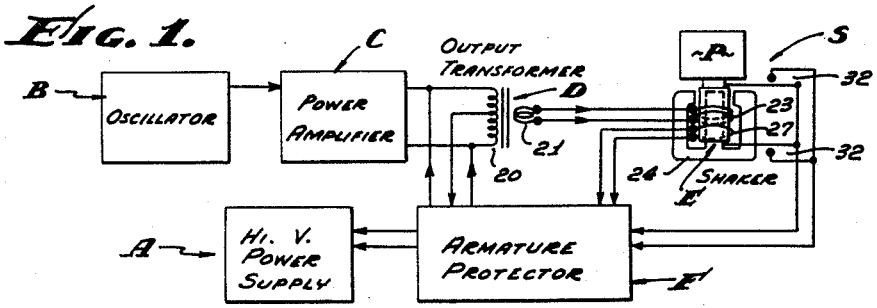

May 3, 1960  J. A. ROSS  2,935,671

POWER CONTROLLING ELECTRICAL CIRCUIT

Filed Aug. 9, 1956

INVENTOR.
JAMES A. ROSS
BY
*Maxwell & Maxwell*
AGENTS.

United States Patent Office 2,935,671
Patented May 3, 1960

2,935,671

POWER CONTROLLING ELECTRICAL CIRCUIT

James A. Ross, San Fernando, Calif., assignor to Ling Electronics Inc., Los Angeles, Calif., a corporation of California Application August 9, 1956, Serial No. 602,992

12 Claims. (Cl. 318—128)

This invention relates to a power controlling electrical circuit and is particularly concerned with an electronic circuit for controlling the power supplied to the armature or the like of an electrical machine, it being a general object of this invention to provide means that practically instantaneously disconnects or diverts a power supply to an armature or the like in order to protect structural parts from being damaged or destroyed by abnormal conditions.

The present invention is particularly applicable to electronic shaking apparatus used for environmentally testing parts and components to be used commercially, for example, aircraft components and the like. The shaking apparatus referred to is employed to subject said part or components to vibrations, the shaking apparatus being operable over a wide band of frequencies and through varying depths of stroke. Shaking apparatus of the type under consideration are capable of handling large components or loads as a result, require correspondingly large input of electrical power. Destructive vibrations are generated and imposed upon the component being tested, and it will be apparent that the shaking apparatus itself may be subjected to unusual and destructive forces and vibrations. That is, there are critical frequencies of vibration, at which frequencies, the shaking apparatus is uncontrollably operated beyond a safe working limit, or there may be mechanical failure of structural parts that would cause such uncontrolled operation. Further, the frequencies of vibrations imposed may be relatively high, each cycle of movement being of relatively short duration and there being considerable energy stored in the apparatus when it is in operation, which energy must be immediately dissipated or diverted. Since the shaker apparatus of the type under consideration involves an armature, I will describe the power controlling circuit of my invention as applied to such an armature, it being understood that there are various electrical machines having armatures or the like to which the present invention may be readily applied.

An object of this invention is to provide means that practically instantaneously diverts a power supply to a moving armature or the like in order to prevent damage or destruction of said armature in the event of abnormal conditions beyond the operating capacities of said armature.

It is an object of this invention to provide means for diverting a power supply as above referred to that is sensitive to varying conditions in the power supply circuit or related circuits to the end that power is cut off the instant following such variation, thus preventing damage to structural parts operated upon by the said power supply. With the apparatus that I provide, time lag is reduced to a small portion of a cycle of the electrical power supplied to the end that the diverting operation can be considered instantaneous for all practical purposes.

It is another object of this invention to provide means that practically instantaneously diverts a power supply from its normal path or circuit and diverts the power through means for absorbing and dissipating said power.

It is still another object of this invention to provide means for dynamically braking of the armature or the like that is disconnected from the power supply so that it is arrested in motion and currents generated thereby absorbed and dissipated.

An object of this invention is to provide a power controlling electrical circuit that is relatively simple and inexpensive and adapted to accomplish the objects above referred to which circuit is free of slow moving mechanical parts and which circuit is dependable and foolproof in operation.

Figure 2:
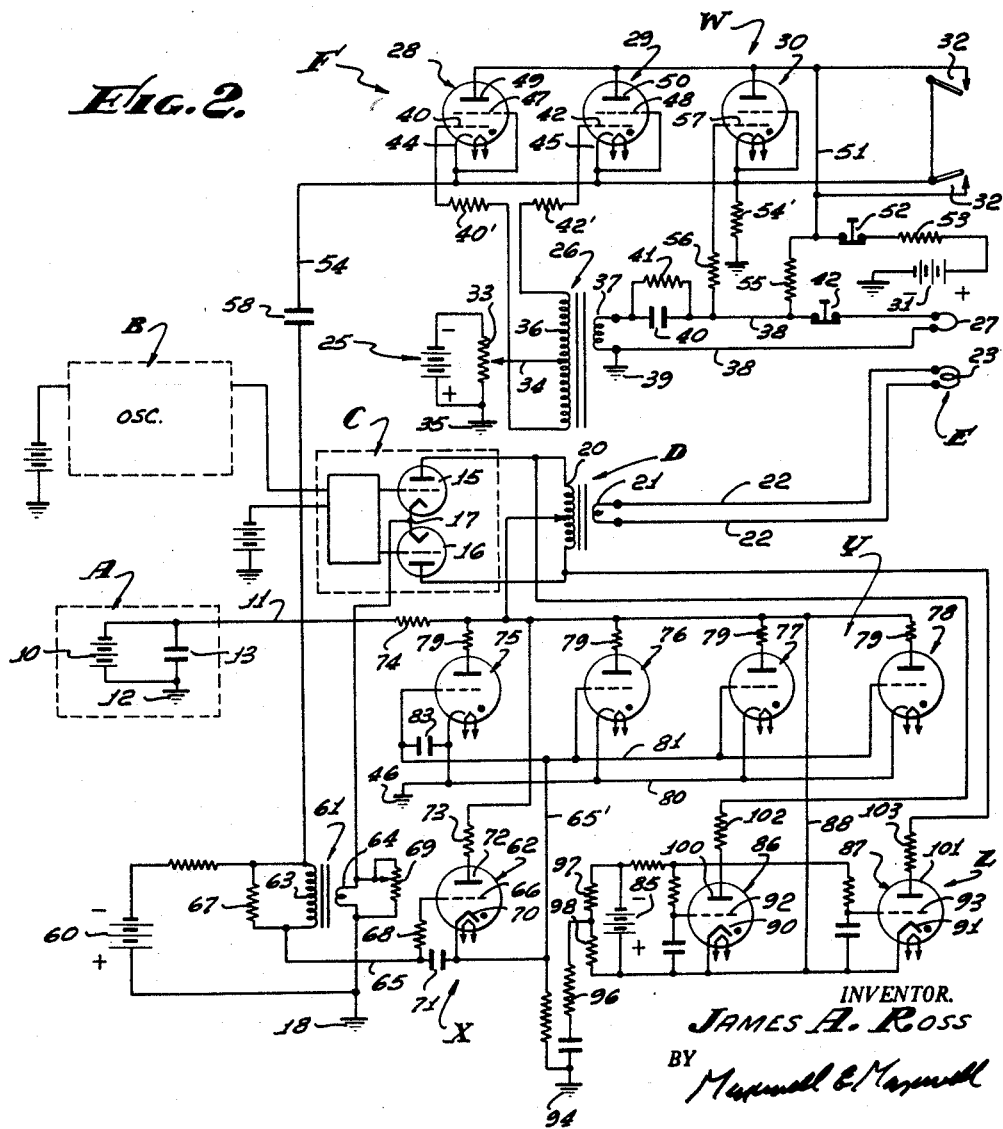

The various objects and features of my invention will be fully understood from the following detailed description of a typical preferred form and application of my invention, throughout which description reference is made to the accompanying drawings, in which:

Fig. 1 is a simple block diagram of a typical application of the power controlling electrical circuit of the present invention, and Fig. 2 is a schematic of the circuit that I have provided, showing it incorporated in a typical electrical shaking apparatus.

The power controlling electrical circuit that I have provided acts to practically instantaneously disconnect or divert, and dissipate the electrical current flowing from a power supply to an armature or the like and to dynamically brake or damp the motion of said armature. As illustrated in Fig. 1 of the drawings, the shaking apparatus may involve generally, a power supply A, an oscillator B, a power amplifier C, an output transformer D, a shaker S having an armature E, and the protective circuit that I have provided which will be referred to as an armature protecting circuit F. The armature protecting circuit F of the present invention is associated primarily with the power supply A and has control connections leading to other parts of the shaking apparatus including the shaker S and the output transformer D. The armature protecting circuit F involves generally, a sensing means W, a firing means X, a current control means Y and a dynamic braking or dampening means Z. The sensing means W is connected electrically with or associated with the shaker S and operates the firing means X. The firing means X in turn operates the current control means Y which is connected with the power supply A whereby the power or current is diverted from the shaker S and is dissipated when abnormal conditions occur.

The power supply A may be of any suitable form as circumstances require and for simplicity of illustration, is shown as a battery 10 delivering direct current to a power bus 11. The battery 10 is grounded at 12 and a capacitor 13 is provided in a shunt between the bus 11 and the ground 12. The power supply A is a high voltage supply and may in practice provide a voltage of approximately 10,000 volts in the bus 11.

The oscillator B may be of any suitable form and construction as circumstances require and is adapted to selectively generate pulsating currents of the desired wave form and at the desired frequency. The oscillator frequency may be from say 50 cycles per second to say 3,000 cycles per second. It is to be observed that a half cycle at 3,000 cycles per second has a duration or time interval of only 166 microseconds. The oscillator B may be suitably powered as by a battery 14 or in any other suitable manner as desired.

The power amplifier C is a variable output amplifier and may be of any suitable form or type and as shown may include power tubes 15 and 16 and driven in push-pull by preliminary amplifying stages (not shown) to the end that the output of the amplifier C is of sufficient power to drive the shaker S through the transformer D. The power tubes 15 and 16 have a common cathode connection 17 that extends through the primary winding of a transformer hereinafter described and is then grounded at 18. In practice, as much as 40,000 watts of alternating current is delivered by the amplifier C to the shaker S through the transformer D.

The output transformer D is a typical transformer characterized by primary and secondary windings 20 and 21 and is interposed between the power amplifier C and the shaker S. That is, the power tubes 15 and 16 energize the primary winding 20 while the secondary winding 21 is of a lower matched impedance connected by power leads 22 to the armature winding 23 of the shaker S. In accordance with the invention, the center of winding 20 is tapped and connected by a lead to the bus 11. It will be apparent how the transformer D couples the power amplifier C and the armature E of the shaker S.

The shaker S under consideration has a field 24 having a central field pole and a circular field pole surrounding and spaced from the central field pole forming an annular opening or cavity to receive the armature E which is of hollowed cylindrical form. The field 24 may be energized as by permanent magnets or by windings and the magnetic flux extends radially between the poles to pass through the winding 23 of the armature E. The armature E may be suitably supported by springs or the like (not shown) and the component or specimen P is fastened to and vibrated by the armature E (see Fig. 1). It will be apparent that the amplified, oscillated, alternating current delivered to the winding 23 of the armature E through the leads 22 will cause the armature to reciprocate relative to the field 24 to the end that the specimen P is vibrated or shaken.

The armature protecting circuit of the present invention involves the sensing means W, the firing means X, the current control means Y and the dynamic braking means Z above referred to, and operates to prevent damage to the shaker S by disconnecting or diverting the current from the power amplifier C and transformer D and by directing the current so that it is dissipated directly from the power supply A directly to ground through limiting resistors. The current means W detects any abnormal displacement or velocity of the armature E and in general involves a primary power supply 25, a step-up transformer 26, a velocity sensing coil 27, current releasing tubes 28, 29, and 30 as circumstances require, a secondary power supply 31, position sensing switches 32 and various other elements as hereinafter described.

The primary power supply 25 is provided to energize the sensing means W and may be of any suitable form. For simplicity of illustration, the power supply 25 is shown as a battery, though it may be in the form of a bridge-type rectifier and voltage regulated bias supply. A potentiometer 33 is included in the power supply 25 and is provided with a movable contact 34 in order to regulate the negative potential at the primary winding of the transformer 26 as hereinafter described. The power supply 25 is grounded at 35.

The step-up transformer 26 is connected to the power supply 25 through the primary winding 36 thereof and receives voltage in the secondary winding 37 from the coil 27 that reflects the velocity of the armature E. The potentiometer contact 34 above referred to, connects with the primary winding 36 at the center thereof while the coil 27 connects with the ends of the secondary winding 37 through a pair of leads 38 in the normal manner.

The velocity sensing coil 27 is in effect a secondary winding wrapped onto the armature E with the winding 23 and generates voltage when it cuts the magnetic lines of force of the field 24. In accordance with the invention, one lead 38 is grounded at 39 while a capacitor 40 and a resistor 41 are connected in parallel in the other lead 38. As shown, a normally closed test switch 42 is provided in one of the lines 38 in order to momentarily open the electrical circuit handled thereby.

The current releasing tubes 28, 29 and 30 are adapted to operate in a manner to cause unidirectional flow of current when abnormal conditions occur in respect to the motion of the armature E. In practice, I employ thyratrons each of which is a gas-filled tube having basically, three elements, an anode, a cathode, and a grid, and wherein the grid controls only the start of a unidirectional flow of current. It is the firing of said thyratrons producing a unidirectional current that I employ to control the power output of the power supply A and related elements. As shown, the sensing means W involves primarily, two thyratrons 28 and 29 of relatively low power capacity arranged in push-pull relation to cause and insure firing on either positive or negative voltage pulses generated by the coil 27.

One end of the primary winding 36 of the transformer 26 is connected to a grid 40'' in the tube 28 through a resistor 41, and the other end of the winding 36 is connected to a grid 42 in the tube 29 through a resistor 42'. The tubes 28 and 29 are heated at the cathodes 44 and 45, respectively, by means of a suitable power source. As shown, shield grids 47 and 48 are provided in the tubes 28 and 29 and are connected with the cathodes 44 and 45, respectively. The anodes 49 and 50 connect to the secondary power supply 31 as hereinafter described.

The secondary power supply 31 is provided to energize the anodes of the tubes 28, 29, and 30, and the switches 32 above referred to and may be of any suitable form as circumstances require. For simplicity of illustration, and like the primary power supply 25, the power supply 31 is shown as a battery though it may be in the form of a rectifier and voltage regulator bias supply. The power supply 31 is grounded and the positive terminal of, for example, a few hundred volts, connects with the anodes of the tubes 28, 29, and 30 through a lead 51. A reset switch 52 and a current limiting resistor are provided in the lead 51. The switch 52 is a normally closed switch and may be opened after firing of the thyratron tubes 28, 29, and 30 to reset the circuit to an operating condition. The firing of the tubes 28 and 29 is caused by an increase in voltage from the coil 27 whereupon the voltage on the grids 40 or 42 approaches zero or produces a positive voltage causing the tube to fire. Firing of the tubes 28 or 29 causes a unidirectional flow of current through a lead 54 that extends to and operates the firing means X hereinafter described.

Recognizing that the tubes 28 or 29 will not fire and discharge current after the circuit handling the coil 27 is open for any reason, I have provided the thyratron tube 30 like the tubes 28 and 29 and suitable resistors 55 and 56. The resistor 55 is connected to the positive terminal of the power supply 31 through the reset switch 52 and is connected to the lead 38 carrying the test switch 42 at a point intermediate the switch 42 and the winding 37. The resistor 56 is connected to the grid 57 of the tube 30 and is also connected to the said lead 38 intermediate the switch 42 and winding 37. The anodes of the tubes 28, 29, and 30 are connected to the lead 51 while the cathodes thereof are separated from ground by a resistor 54' connected to lead 54. A break in the circuit handling coil 27 results in a rise in voltage at the grid 57 of the tube 30 whereby the thyratron tube 30 is fired. Firing of any one of the tubes 28, 29, 30 causes a unidirectional current to flow through the resistor 54' and voltage through the lead 54 and through a capacitor 58.

In addition to the current sensing circuit thus far described, there is also provided one or more limit switches 32 preferably at the upper and lower ends of the armature E. The switches 32 are in parallel with each other and are normally open switches connected between the lead 51 and the lead 54. Closing of either of the switches 32 causes a direct flow of current through the lead 54 and capacitor 58 to operate the firing means X.

The firing means X like the sensing means W employs the use of the thyratron tube and operates at higher power and is sensitive to or is operated by the unidirectional surge of voltage conducted by the lead 54. The firing means X acts to operate the current control means Y and requires higher currents for its operation than is ordinarily obtainable from the tubes 28, 29, and 30. As shown, the firing means X involves generally, a power supply 60, a transformer 61, a thyratron tube 62, and various other elements as hereinafter described. The power supply 60 like the power supplies 25 and 31, is illustrated as a battery but may be of any other suitable form and impresses a negative potential, say for example, 75 volts, on the means X which prevents the thyratron tube 62 from firing except when a surge of positive polarity reasonably in excess of 75 volts passes through the capacitor 58 and lead 54.

The transformer 61 has a secondary winding 63 and a primary winding 64, the negative terminal of the power supply 60 being connected to one end of the secondary winding 63, the other end of the winding 63 being connected to the grid 66 of the tube 62 through a lead 65. A lead 65' is extended to the current controlling means Y as hereinafter described. The secondary winding 63 is shunted by a resistor 67 and a resistor 68 is also interposed between the lead 65 and the grid 66. The thyratron tube 62 may operate on about 10,000 volts anode voltage and is adapted to fire with a negative potential on the grid. The primary winding 64 is interposed between the cathode of the power tubes 15 and 16, above described, and the ground 18, there being a variable resistor 69 shunting the primary winding 64 to provide low resistance path to ground for the plate current which flows in the amplifier. Thus, excessive currents within the power tubes will cause firing of the tube 62 preventing damage to the amplifier C.

The thyratron tube 62 as above stated is more powerful than the thyratron tubes 28, 29, and 30, the cathode 70 thereof being connected to the lead 65 through a relatively small capacitor 71 to prevent the tube 62 from firing due to short duration voltage pulses that sometimes occur. The anode 72 is connected with the bus 11 above described, through a resistor 73, there being a buffer resistor 74 in the bus 11 between the anode 72 and the power supply A. When the thyratron tube 62 is fired by a surge from the sensing means W or from the amplifier C, a unidirectional current is delivered from the cathode through the lead 65' to the current control means Y.

The current control means Y involves one or more current releasing tubes, preferably thyratron tubes, the number of tubes depending upon the capacity of the particular tubes employed and upon the amount of current desired to be diverted and dissipated. For example, in the case illustrated, there is a plurality of tubes 75, 76, 77, and 78, each capable of handling 250 amperes to the end that 1,000 amperes from capacitor 13 can be handled. In practice, the current handled by each thyratron tube is limited by identical resistors 79 connected between the anode of each thyratron tube and the bus 11. The cathodes of the thyratron tubes 75, 76, 77, and 78 are joined together in a bus 80 that connects to a ground 46. The grids of the thyratron tubes 75, 76, 77, and 78 are joined together in a bus 81 that connects to the lead 65' in order to receive the surge of current delivered from the firing means X when the said firing means is operated by the sensing means W. The bus 81 also connects to the bus 80 through a capacitor 83 to serve the same purpose as the capacitor 71 above described in connection with the firing means X.

It will be apparent that I have provided for the control of current without the use of the usual mechanical circuit braking devices ordinarily employed. Since each thyratron tube that I employ requires only a very few microseconds to fire, it will be readily seen that the total time required for firing the three stages of thyratrons that I employ will still be but an extremely short interval of time. I have found that in apparatus of the type under consideration the time required to divert the power ranges from 25 to 50 microseconds.

In order to put the circuit and apparatus above described into normal operation, the contact 34 at the power supply 25 is adjusted to give a negative bias a few volts greater than the maximum amplitude of the alternating voltage generated by the coil 27, the said voltage appearing in stepped-up magnitude across the secondary winding 37 of the transformer 26. Since the thyratron tubes fire at a smaller negative voltage, firing does not take place and normal operation continues. However, as soon as an abnormal condition or movement of the armature E occurs, the instantaneous output from the coil 27 increases the voltage on the grids 40 or 42, and the thyratron cathodes 44 or 45 then change from a potential near ground, being thus maintained by the resistor 54' in the absence of flow of current, to a potential near the positive value of the power supply 31 because of the small internal voltage drop of the conducting thyratron. The above condition causes a large voltage surge to pass through the lead 54 and capacitor 58 which surge is used to operate the firing means X and the current control means Y as hereinabove described.

The dynamic braking or damping means Z that I have provided is operated in conjunction with the electrical circuit thus far described to further protect the armature E of the shaker S by arresting the motion thereof. Assuming that the circuit handling the coil 23 is closed, current will be generated by movement of the armature. As shown, the dynamic braking means Z involves generally, a power supply 85, one or more, preferably a pair of, current releasing tubes 86 and 87 and various other elements as hereinafter described.

The power supply 85 may be in the form of a simple battery or the like and is supplemented by power from the bus 11 through a lead 88. The lead 88 connects to the cathodes 90 and 91 of the tubes 86 and 87, the grids 92 and 93 of the tubes being grounded at 94. A net of resistors 96, 97, and 98 is provided, as shown, causing the potential of the grids 92 and 93 to lag and thus assume a positive potential with respect to the cathodes and overcoming the negative bias of the power supply 85. The anodes 100 and 101 of the tubes 86 and 87 are connected to opposite ends of the primary winding 20 of the transformer D, there being resistors 102 and 103 limiting the current to each thyratron tube 86 and 87, respectively. It will be apparent that movement of the winding or coil 23 generates a surge of voltage that is directed to the anodes of the thyratron tubes 86 and 87 to the end that the tubes are unbalanced and are fired to dissipate the current to the ground 94.

From the foregoing, it will be apparent that I have provided an electrical circuit entirely electronic in nature and which acts instantly in a matter of a few microseconds to divert otherwise damaging power and to damp or brake otherwise damaging motion of moving parts. Adjustments are provided as above described, for example, the variable resistance 69 is selectively positioned in order that the normal plate current of the amplifier and minor variations will not give a large enough pulse in the winding 63 to fire the thyratron tube 62. Further, the entire circuit may be protected by the usual overload circuit breakers (not shown) that may be operated by any one or all of the power controlling thyratron tubes 75 to 78.

Having described only a typical preferred form and application of my invention, I do not wish to be limited or restricted to the specific details herein set forth but wish to reserve to myself any variations or modifications that may appear to those skilled in the art and fall within the scope of the following claims.

Having described my invention, I claim:

1. A power controlling circuit composed of electrical elements for mechanically protecting an alternating current operated mechanically-vibratory armature or the like, including, a sensing means actuated by vibration of said armature, a power supply, a pair of gaseous current releasing tubes connected to said power supply and operable in push-pull by said sensing means upon an abnormal vibration of said armature in either direction to pass a flow of current from said power supply, and a current control means having at least one gaseous discharge tube responsive to said current from said power supply and adapted to divert the armature operating current from said armature; said gaseous current releasing tube and said gaseous discharge tube adapted for sequential operation upon an abnormal vibratory condition of said armature and within intervals of time short with respect to an alternation of said armature operating current.

2. An electronic power controlling circuit for protecting a vibratile armature or the like including a position sensing means operated by movement of said armature, means to energize said armature, a power supply to energize said means to energize, and a current control means having at least two current releasing tubes connected for actuation by said position sensing means, at least one current releasing tube connected to said armature for exercising electrical braking and at least one other current releasing tube connected to said power supply to divert power from said armature upon abnormal excitation of said position sensing means; said electronic power controlling circuit adapted to sufficiently rapidly divert said power to prevent a destructive amplitude of movement of said armature.

3. An electrical power controlling circuit for operating a reciprocatively translative armature within a limit comprising motion-responsive means coactive with said armature, first electrical means connected to said motion-responsive means to pass electrical energy upon a response of said motion-responsive means beyond said limit, second electrical means to operate said armature, third electrical means connected to said first electrical means for control and to said second electrical means for diverting electrical energy from said second electrical means upon a response of said motion-responsive means beyond said limit, and fourth electrical means connected to said first electrical means for control and to said armature to dissipate electrical energy therefrom, said first, third and fourth means adapted to function sufficiently rapidly to maintain motion of said armature within said limit.

4. An electronic power controlling circuit for operating a vibratory armature within safe limits comprising vibration-responsive means coactive with said armature, electronic means connected to said vibration-responsive means to pass electric current upon a response of said vibration-responsive means beyond said safe limits, electrical means to vibrate said armature, said electrical means having a power supply, second electronic means connected to said vibration-responsive means through said electronic means for control and to said power supply for diverting current from said electrical means upon a response of said vibration-responsive means beyond said safe limits, and third electronic means connected to said vibration-responsive means for control and to said armature to provide a power-dissipative connection of low impedance across said armature upon a response of said vibration-responsive means beyond said safe limits.

5. An electronic power controlling circuit for operating a vibratory armature within safe limits of mechanical excursion comprising vibration-responsive means coactive with said armature, first conductible means connected to said vibration-responsive means to pass electrical energy upon a response of said vibration-responsive means beyond said safe limits, electrical means to vibrate said armature having a power supply, second conductible means connected to said electrical means for control to pass electrical energy upon the occurrence of an amplitude of current in said electrical means beyond said safe limits, third conductible means connected to said first and said second conductible means for control and to said power supply for diverting current from said electrical means upon a response of said vibration-responsive means beyond said safe limits, and fourth conductible means to apply electrical restraint to said armature upon the actuation of a prior said conductible means; said conductible means operative in a sufficiently short time to prevent damage to said armature.

6. A power controlling circuit for operating an armature arranged for vibratory motion within a limit comprising vibration-responsive means connected to said armature, first means connected to said vibration-responsive means to pass electrical energy upon a response of said vibration-responsive means beyond said limit, electrical means to operate said armature, said electrical means having a power supply, second means connected to said electrical means for control to pass electrical energy upon the occurrence of electrical energy in said electrical means beyond said limit, third means connected to said first and said second means for control and to said power supply for diverting electrical supply energy from said electrical means upon a response of said vibration-responsive means beyond said limit, and fourth means connected to said third means and to said armature for exercising electrical braking on said armature upon the flow of diverted electrical energy in said third means; the numbered means adapted to function as a group within a time sufficiently short to retain operation of said armature within said limit.

7. An electronic power controlling circuit for operating a vibratory armature within safe limits comprising vibration-responsive means mechanically connected to said armature, first electronic means connected to said vibration-responsive means to pass electric current upon a response of said vibration-responsive means beyond said safe limits, electrical means to vibrate said armature, a power supply to energize said electrical means, second electronic means connected to said electrical means for control to pass electric current upon the occurrence of current in said electrical means beyond said safe limits, third electronic means connected to both said first and second electronic means for control and to said power supply for diverting electrical energy from said electrical means upon a response of said vibration-responsive means beyond said safe limits, and fourth electronic means connected to said third electronic means for control and to said armature circuit for exercising dynamic electrical braking of said armature upon the flow of diverted current in said third electronic means; all said electronic means adapted to function within a time short with respect to one vibration of said armature.

8. A power controlling circuit for non-destructive actuation of a periodically actuated armature or the like comprising actuation-sensitive means coactive with said armature, discharge means connected to said actuation-sensitive means to activate upon abnormal actuation of said actuation-sensitive means, means to drive said armature, second discharge means connected to said means to drive said armature, said second discharge means adapted to activate upon abnormal electrical energy present in said means to drive, means to electrically power said means to drive said armature, third discharge means connected to both the prior discharge means for activation and to said means to electrically power for deactivation thereof, and fourth discharge means connected to said third discharge means for activation thereby and to said armature to inhibit non-destructive actuation thereof; said power controlling circuit sufficiently rapidly coactive to prevent even one destructive actuation of said armature.

9. An electronic power controlling circuit for limiting reciprocatory motion of an armature or the like comprising motion-sensitive means attached to said armature, means to electrically drive said armature discharge means connected to said motion-sensitive means adapted to actuate upon excessive motion of said motion-sensitive means, second discharge means connected to said motion-sensitive means adapted to actuate upon malfunctioning of said motion-sensitive means, third discharge means connected to said means to electrically drive said armature, said third discharge means adapted to actuate upon abnormal actuation of said means to electrically drive said armature, said third discharge means also connected to both prior discharge means to be actuated upon the actuation of either said prior discharge means, fourth discharge means connected to said third discharge means for actuation thereby and to electrical energy means for energizing said means to electrically drive said armature to discharge said electrical energy means, and fifth discharge means connected to said fourth discharge means for actuation thereby and to said armature to electrically dissipatively arrest the motion thereof; said electronic power controlling circuit sufficiently rapidly coactive to limit the motion of said armature within any one excursion of said motion.

10. An electronic power controlling circuit for protecting an oscillatory armature or the like comprising a coil connected to said armature, means to electrically drive said armature, a pair of thyratrons connected to said coil adapted to fire upon excessive motion of said coil, a third thyratron connected to said coil adapted to fire upon opening of said coil circuit, excessive travel switches coactive with said armature, means connected to said switches to cause an electrical pulse equivalent to that caused by firing any of said thyratrons upon the actuation of either of said switches, a fourth thyratron connected to said means to electrically drive said armature, said fourth thyratron adapted to fire upon abnormally large electrical energy in said means to electrically drive, said fourth thyratron also connected to each prior thyratron to be fired upon the firing of any prior said thyratron, plural thyratrons, said plural thyratrons connected to said fourth thyratron for firing thereby and to the electrical power supply for said armature driving means for the discharge of said power supply, and a second pair of thyratrons connected to said plural thyratrons for firing thereby and to said armature to brake the same by dissipating electrical energy; the several said thyratrons adapted to fire sufficiently rapidly to arrest motion of said armature before a destructively large amplitude is reached.

11. The power controlling circuit of claim 10, in which a first switch is connected to open the circuit of said coil to test said power controlling circuit upon the actuation of said first switch, and a second switch is connected to said pair and said third thyratrons to reset said power controlling circuit after the same has accomplished a protective actuation.

12. An all-electronic power controlling circuit for protecting a vibratile armature or the like comprising a velocity coil upon said armature, two thyratrons connected in push-pull and to said velocity coil adapted to fire upon excessive velocity of said coil in either direction, a third thyratron connected to said velocity coil adapted to fire upon opening of the circuit of said velocity coil, limit travel switches coactive with said armature, means connected to said switches to cause an electrical pulse equivalent to that caused by firing any of said thyratrons upon the actuation of said switches, means to electrically drive said armature, a fourth thyratron connected to said means to electrically drive said armature for firing thereby, said fourth thyratron adapted to fire upon an abnormal electrical surge in said means to electrically drive said armature, said fourth thyratron also connected to each prior said thyratron to be fired upon the firing of any thereof, a power supply connected to said means to electrically drive said armature, plural power thyratrons, said plural power thyratrons connected to said fourth thyratron for firing thereby and to said power supply for the discharge thereof upon firing, a pair of thyratrons, said pair of thyratrons connected to said plural power thyratrons for firing thereby and to said armature circuit to brake the same by shorted generator electrical action; said power controlling circuit adapted to sufficiently rapidly dissipate electrical energy to limit the motion of said armature within one cycle of said motion.

References Cited in the file of this patent

UNITED STATES PATENTS

| | | |
|---|---|---|
| 2,322,217 | Baird | June 22, 1943 |
| 2,576,518 | Knauth | Nov. 27, 1951 |
| 2,713,138 | Lanfers | July 12, 1955 |
| 2,757,330 | Boyer | July 31, 1956 |